United States Patent [19]

Cheng

[11] 4,306,888
[45] Dec. 22, 1981

[54] METHOD FOR FILTERING DUST

[75] Inventor: Paul J. Cheng, Bartlesville, Okla.

[73] Assignee: Phillips Petroleum Company, Bartlesville, Okla.

[21] Appl. No.: 114,927

[22] Filed: Jan. 24, 1980

[51] Int. Cl.³ .............................................. B01D 46/04
[52] U.S. Cl. .......................................... 55/96; 55/291; 55/302; 55/378; 55/341 NT; 55/341 MC; 55/97
[58] Field of Search .................... 55/96, 97, 302, 303, 55/378, 379, 291, 341 NT, 341 MC

[56] References Cited

U.S. PATENT DOCUMENTS

| | | | |
|---|---|---|---|
| 2,741,330 | 4/1956 | Kaess | 55/302 |
| 3,057,137 | 10/1962 | Perlis | 55/303 |
| 3,095,289 | 6/1963 | Egan | 55/293 |
| 3,178,868 | 4/1965 | Gibby | |
| 3,243,940 | 4/1966 | Larson | 55/96 |
| 3,325,979 | 6/1967 | Smith | 55/96 |
| 3,410,056 | 11/1968 | Reinauer | |
| 3,630,004 | 12/1971 | Adair | 55/302 |
| 3,803,807 | 4/1974 | Mills | 55/96 |
| 3,999,968 | 12/1976 | Brookman | 55/303 |
| 4,058,379 | 11/1977 | Cheng | 55/302 |

FOREIGN PATENT DOCUMENTS

| | | | |
|---|---|---|---|
| 6905021 | 10/1970 | Netherlands | 55/302 |
| 977881 | 12/1964 | United Kingdom | 55/302 |
| 507337 | 8/1976 | U.S.S.R. | 55/96 |

*Primary Examiner*—Bernard Nozick

[57] ABSTRACT

A method for filtering dust from a dust-laden gas stream utilizing a tubular fabric filter is provided wherein cleaning of said filter is accomplished by backflow of gas through the filter wall and axial pulsations of gas along the longitudinal axis of the tubular filter.

6 Claims, 2 Drawing Figures

METHOD FOR FILTERING DUST

BACKGROUND OF THE INVENTION

The present invention relates to a self-cleaning method for filtering dust. In another aspect, the invention relates to an improved method for cleaning tubular fabric filters.

Finely divided particulate is frequently filtered from a dustladen gas stream with a tubular filter constructed of fabric material. The fabric material is usually porous with the average diameter of the pores generally being larger than the diameters of the smallest particles to be filtered. When very clean filters, for example, new filters, are utilized, a portion of the particles pass through the filter and are not recovered. As filtering operations continue, particles accumulate on the filter partially clogging the over-size pores and thereby increasing the effectiveness of the filter. The portion of particles collected by the filter from the gas stream increases with increasing amounts of collected particulate. Eventually, the accumulation of particles on the filter is so heavy that the gases in the gas stream can no longer satisfactorily pass through the filter. At this point it is highly desirable to clean the particles from the filter.

Cleaning of the tubular filter has been usually carried out by reverse flow of gases through the filter wall. This method of cleaning the filter generally either results in inadequate cleaning due to the total collapse of the tubular filter or in uneven cleaning with portions of the filter being made too clean for efficient filtering. The cause of uneven cleaning is that the tubular fabric filter partially collapses in areas between its annular supportive structures thereby forming a venturi-shaped passage or series of venturi-shaped passages along its length. The pressure at the throats of these venturi-shaped passages is lower than the pressure at other points within the tubular fabric filter resulting in a higher pressure differential between the exterior of the tubular fabric filter and the interior of the tubular fabric filter at the area of the venturi than the pressure differential between the outside of the tubular fabric filter and other points within the tubular fabric filter. The higher pressure differential causes a disproportionately large amount of gas to reverse flow through the wall of the tubular fabric filter adjacent to the venturi-shaped passage causing a disproportionate amount of cleaning. Utilization of low back flow pressure to avoid formation of venturi-shaped passages generally results in inadequate cleaning of the filter wall.

Another method by which the prior art teaches that tubular filters can be cleaned is by injecting a pulse of gas along the longitudinal axis of the filter. Utilization of this method tends to shear accumulated particulate cake from adjacent the interior surface of the filter wall. A disadvantage of this method is that particulate accumulations in the interstices of the tubular filter wall are not removed unless, as in U.S. Pat. No. 3,178,868, there is enough slack in the wall of the filter so that the wall of the filter will snap inwardly to dislodge the interstitial accumulations upon passage of the axial pulse. Reverse flow cleaning is not particularly efficient with a slack-walled tubular filter because it causes collapse of the filter.

Because reverse flow gases are best suited for dislodging interstitial accumulations of particulate, and axial pulsed gases best suited for removing caked accumulations of particulate, it is extremely desirable to provide a method by which reverse flow and pulsed cleanings of tubular fabric filters can be most efficiently combined.

OBJECTS OF THE INVENTION

It is thus an object of this invention to provide a method for filtering dust which utilizes both reverse flow and pulsed gases for cleaning.

It is another object of this invention to provide a method for filtering dust which has a high capacity and minimal time lost in cleaning operations as compared to methods provided by the prior art.

It is a further object of this invention to provide a method for filtering dust which is highly efficient in the amounts of gas utilized for cleaning of the filter as compared to the methods provided by the prior art.

It is a still further object of this invention to provide an improved method for cleaning tubular fabric filters wherein both reverse flow and axial pulsed gases can be most efficiently combined.

SUMMARY OF THE INVENTION

In accordance with the present invention, it has been discovered that dust can be most efficiently filtered from a stream of dust-laden gases by a tubular fabric filter which has been optimally cleaned by combined pulsed jet and backflow methods. In another aspect, it has been discovered that dust-laden tubular fabric filters can be most efficiently cleaned by combined pulsed jet and backflow gases and that utilization of the combined pulsed jet and backflow gases accomplishes optimal cleaning of the tubular fabric filters with lesser amounts of compressed gases than had heretofore been necessary to effect cleaning of the tubular fabric filters by either backflow or pulsed gases alone.

Other objects and advantages of the present invention will become apparent from the following detailed description taken in connection with the accompanying drawings wherein are set forth by way of illustration and example certain embodiments of this invention.

BRIEF DESCRIPTION OF THE DRAWINGS

Referring to FIG. 1, a dust-laden stream is charged via conduit 18 into housing 24. A horizontal partition 34 having a passage 36 and a passage 38 therethrough separates the housing 24 into upper and lower portions. In the upper portion is located tubular fabric filters 40 and 42 which can be substantially as those shown and described in U.S. Pat. No. 3,410,061 for example. Although only two tubular fabric filters are illustrated in FIG. 1, it is to be understood that many more tubular fabric filters can be, and usually are, utilized. Preferably, the tubular fabric filters utilized in the present invention are elongated in form and have supportive rings adjacent the filter wall. More preferably, the tubular fabric filters are oriented in a substantially vertical position and are stretched along the longitudinal axis so as to be under a tension. A vertical partition 44 separates the upper portion of the housing 24 into upper compartments 46 and 48. The lower portion of housing 24 forms a lower compartment 50, the walls of which taper down to form a hopper bottom 52 into which the dust particles settle down as the gas flows through as well as when the filters are being cleaned. A dump gate can be provided to empty the settled dust when it accumulates to a sufficient degree via conduit 26.

Figure 1:
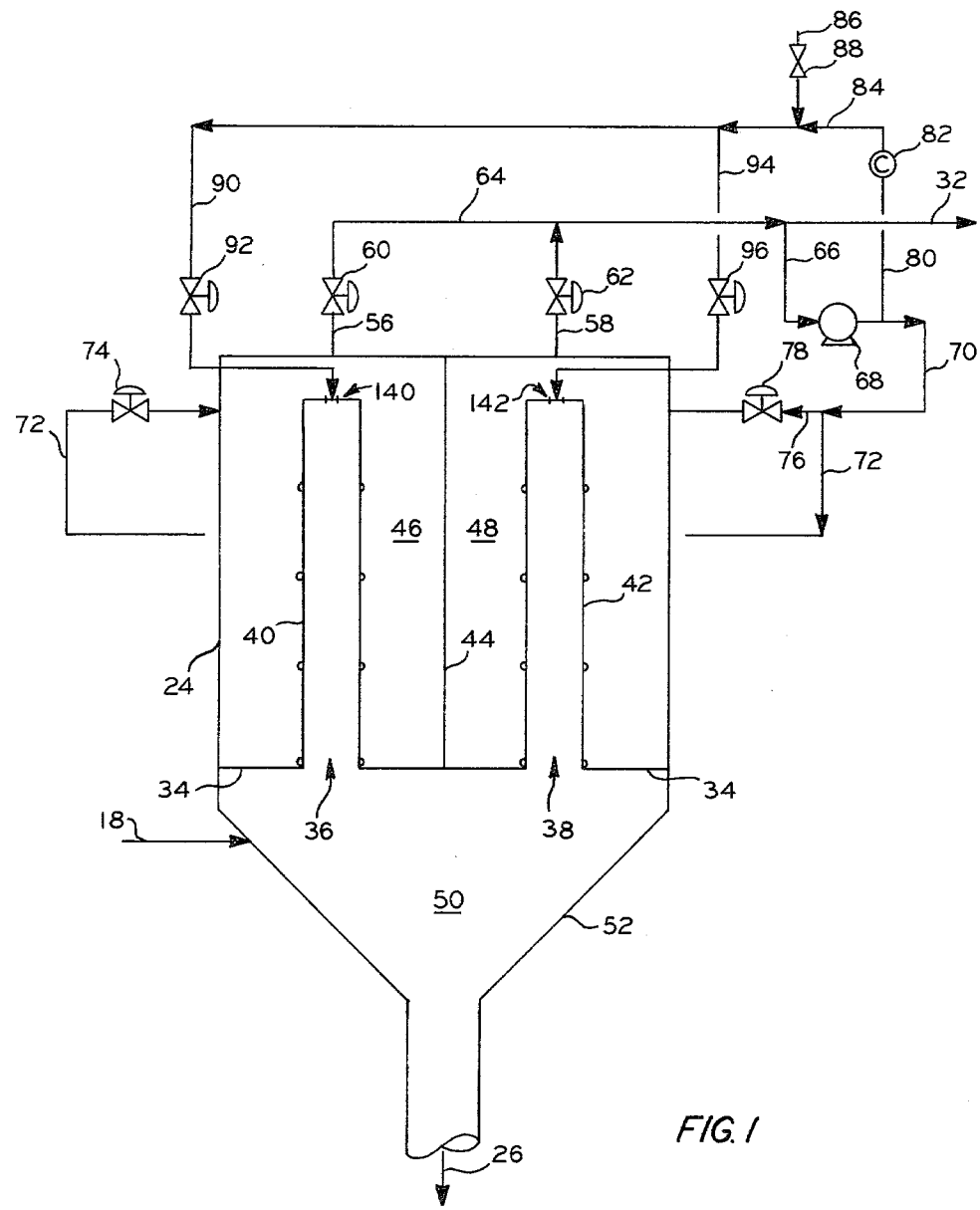
FIG. 1 is a schematic showing a side view of a filter and associated piping and equipment for carrying out one embodiment of the process of the present invention.

An exhaust conduit 56 communicates with upper compartment 46 and has a valve 60 associated therewith. An exhaust conduit 58 communicates with the upper compartment 48 and has valve 62 associated therewith. The exhaust conduits 56 and 58 open into an exhaust conduit 64. The exhaust conduit 64 functions as the means for removing exhaust gases from the housing 24 and also communicates with a blower intake conduit 66. The blower intake conduit 66 communicates with a blower 68 which is in flow communication with a blower exhaust conduit 70. The blower exhaust conduit 70 communicates with a backflow or repressuring conduit 76 which is in communication with the upper compartment 48. The backflow conduit 76 has a valve 78 between its communications with the blower-exhaust conduit 70 and the upper chamber 48. The blower-exhaust conduit 70 also communicates with a backflow conduit 72 which is in communication with the upper chamber 46. A valve 74 is located in the backflow conduit 72 in between the chamber 46 and the blower-exhaust conduit 70. The blower-exhaust conduit 70 also communicates with a compressor intake conduit 80 which comprises a passage from the blower-exhaust conduit 70 to a compressor 82. The compressor 82 is in communication with a compressor exhaust conduit 84. A compressed gas source 86 regulated by a valve 88, may be provided in flow communication with the compressor exhaust conduit 84 to boost the pressure maintained in the compressor exhaust conduit 84 by the compressor 82. The compressor exhaust conduit 84 communicates with axial gas conduits 94 and 90 which communicate with axial injection means 140 and 142 located in the chambers 46 and 48, respectively. The compressed gas from source 86 can be used in conduits 94 and 90 in lieu of compressor output 84. The axial gas conduit 94 contains a valve 96 to regulate the flow of gas to the axial injection means 142, and the axial gas conduit 90 contains a valve 92 to regulate flow of gas to the axial injection means 140.

Figure 2:
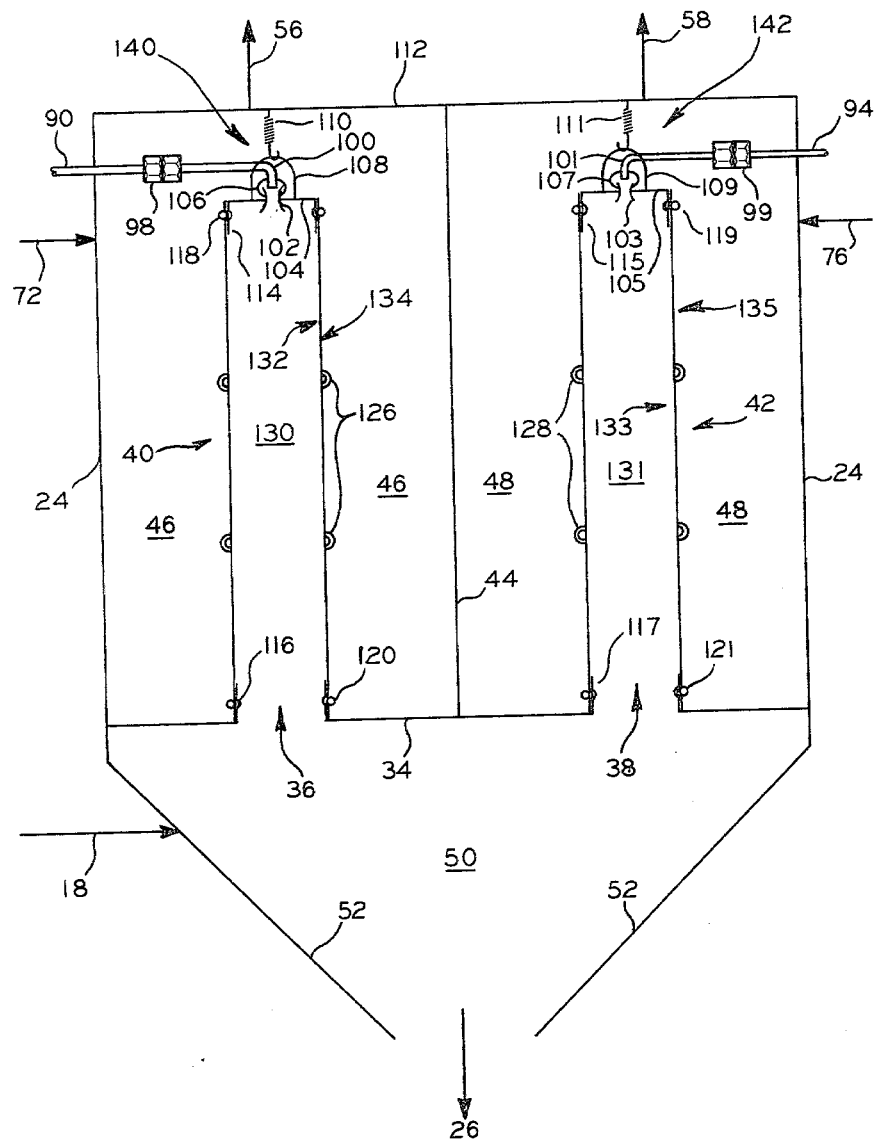
FIG. 2 is an enlarged view of the filter of the apparatus depicted in FIG. 1.

Referring now to FIG. 2, the components within each chamber 46 and 48 will be described in parallel. The axial injection means 140 and 142 comprise couplings 98 and 99 retaining L-shaped conduits 100 and 101 to axial gas conduits 90 and 94, respectively. Lower portions of L-shaped conduits 100 and 101 each have an outlet centered above their respective venturi tube members 102 and 103. The venturi tube members 102 and 103 are fastened to top tubular fabric filter plates 104 and 105 and provide a passage therethrough. L-shaped conduit positioning means 106 and 107 are attached to the tops of the venturi members 102 and 103 and are adapted for retaining the lower portions of L-shaped conduits 100 and 101 in coaxial positions with the venturi members 102 and 103. Upper tubular filter support means 108 and 109, for example, chains or cables or rigid loop means are affixed to the top tubular fabric filter plates 104 and 105 and extend upwardly to fastening means such as hooks or springs 110 or 111 which are affixed to upper portion 112 of the housing 24. Springs are preferred, because they serve to reliably tension the filters along their longitudinal axis. The top tubular fabric filter plates 104 and 105 have downwardly extending flanges 114 and 115 forming upper thimbles for the support of the tubular fabric filters 40 and 42. Upwardly extending portions of horizontal partition 34 form flanges around passages 36 and 38 and serve as lower tubular fabric filter retaining thimbles 116 and 117. Top ring clamps or snap rings 118 and 119 affix tubular fabric filters 40 and 42 to upper thimbles 114 and 115. Lower ring clamps or snap rings 120 and 121 affix lower portions of tubular fabric filters 40 and 42 to lower thimbles 116 and 117. Annular rigid support rings 126 and 128 are affixed to the walls of filters 40 and 42 and aid in preventing excessive collapse of tubular fabric filters 40 and 42 during cleaning operations. The passages 36 and 38 communicate with interior volumes 130 and 131 of tubular fabric filters 40 and 42. Tubular fabric filters 40 and 42 have interior upstream surfaces 132 and 133 and exterior downstream surfaces 134 and 135.

In the operation of the present invention, a stream of dust-laden gases is introduced into the lower compartment 50 of the housing 24 by the conduit 18. For the purpose of explanation, it will be assumed that the tubular fabric filter 40 is involved in the cleaning cycle and the tubular fabric filter 42 is involved in the filtering cycle. The dust-laden stream of gases flows from lower compartment 50 through the passage 38 to the interior volume 131 of tubular fabric filter 42. Valve 60 is closed and valve 62 is open. A portion of the dust in the dust-ladened gas stream collects adjacent the interior upstream surface 133 of the tubular fabric filter 42. A portion of the gas in the dust-ladened gas stream passes through the wall of the tubular fabric filter 42 into the upper compartment 48 and from there flows via the exhaust conduit 58 and the valve 62 to the exhaust conduit 64. A portion of the gas flowing through the exhaust conduit 64 enters the blower intake conduit 66 and flows to the blower 68 where a pressure boost occurs. The gas then flows from the blower 68 through the blower exhaust conduit 70 to the backflow conduit 72 and the valve 74 which is in an open position. The gas from the backflow conduit 72 then enters the chamber 46 and flows from the exterior downstream surface 134 of filter 40 to the interior upstream surface 132 of filter 40 into the interior volume 130 of the tubular fabric filter 40. The tubular fabric filter 40 is tensioned along its longitudinal axis to a tension in the range of about 1 to about 10 pounds, preferably in the range of from about 1 to about 4 pounds, most preferably about 2 pounds, per inch of circumference at its open end between flanges 114 and 116 and is supported by support rings 126 to ward against collapse by the gases from backflow conduit 72. The pressure of the gas is insufficient to collapse filter 40. By flowing through the wall of the tubular fabric filter 40 in this manner, the backflow gas removes a portion of the dust previously deposited adjacent the interior upstream surface 132 of the tubular filter 40 and also a portion of the interstitial dust within the pores of the fabric from which filter 40 is constructed. The displaced dust falls into the lower compartment 50 and settles along the hopper bottom 52 where it can be removed as desired via conduit 26.

By closing the valves 62 and 74 and opening the valves 60 and 78, gases from the upper compartment 46 can be made to flow through the filter 42 from a downstream to upstream direction. By intervallically reversing the flow of gases between the chambers 46 and 48 at least one of tubular fabric filters 40 or 42 can be maintained in a filtering cycle at all times. It is to be understood that both filters can be involved in filtering operations at the same time by opening valves 60 and 62 and closing valves 74 and 78.

After each filter has been through a number of filtering and cleaning cycles, generally between about 5 and 15, it is desirable to inject at least one axial pulse of gas longitudinally down the tubular fabric filter to remove excess dust from adjacent the interior surface of the filters. The gas pulse can be at a pressure of from about 5 to about 50 pounds per square inch. This is done by opening the valve 92 or 96 corresponding to the tubular fabric filter 40 or 42 which is involved in a cleaning cycle by backflow due to valve 74 or 78 being in an open position. It is desirable that valves 92 and 96 be of a quick operating type such as a solenoid controlled construction. The valve 92 or 96 is opened momentarily from a period of about 0.2 to about 2 seconds so that a pulse of gas flows from compressor 82 and/or compressed gas source 86 through the appropriate gas conduit coupling 98 or 99 and L-shaped conduit 100 or 101 and from there through the venturi member 102 or 103 and axially down the longitudinal axis of the tubular fabric filter 40 or 42. The volume ratios of the amount of pulsed gas to the total amount of backflow gas is preferably from about 1:2 to about 3:1, more preferably between about 2:3 to about 2:1.

A calculated example is provided which illustrates typical operation of the invention. In the calculated example, carbon black is filtered from a stream of carbon black reactor off-gases, although the invention is not to be considered as limited to filtering carbon black.

| TYPICAL OPERATION ("Calculated") | |
|---|---|
| Number of Bags (40 or 42) per chamber: | 400 |
| Each Bag: | |
| Length, inches, | 180 |
| Diameter, inches | 5 |
| Material, | Glass fiber |
| Chamber (46 or 48): | |
| Height, feet, | 18 |
| Cross-sectional (horizontal), feet | 13 × 15 |
| Axial injection means (140 or 142) | |
| "L" Shaped Conduit (100 or 101) | |
| Inside Diameter, Inches (ins.) | 0.5 |
| Venturi member (102 or 103) | |
| Length, inches, | 7 |
| Converging Zone length, ins. | 2 |
| Diverging Zone length, ins. | 5 |
| Throat Diameter, ins. | 0.25 |
| Distance of "L" shaped conduit Outlet Upstream of "Venturi" Throat, ins., | 4 |
| Venturi Inlet, Diameter, ins., | 1.25 |
| Venturi Outlet, Diameter, ins., | 2.00 |
| Backpressure Gas (72 or 76) (off-gas): | |
| Temperature, °F., | 450 |
| Pressure, inches of water, | 16 |
| Flow, Standard Cubic Feet (SCF)/second, | 150 |
| Duration of Flow, seconds, | 20 |
| Pulsing Gas (90 or 94) (Compressed Air): | |
| Temperature, °F., | 400 |
| Pressure, psig., | 15 |
| Flow, SCF/second | 110 |
| Duration of Pulse, seconds, | 0.8 |

The pulsing is effected only about once in every 5 to 15 cycles (filtration plus backflow) during a backflow, e.g. one pulse each 10 cycles. During the filtration cycle, the carbon black-containing smoke enters the filter at about 550° F. and about 14 inches of water pressure. The smoke has about 5 pounds of carbon black per 1000 SCF. About 60 standard cubic feet, hereinafter SCF, of smoke can pass through each bag before backflow is started. The filtering cycle runs about 4 minutes. About 600 SCF of smoke can pass through each bag before an axial pulse is introduced.

During the backflow cycle, the off-gas enters at about 450° F. and at about 15 inches of water pressure. About 7.5 SCF of off-gas is used through each bag before the bag is again back on filtering. This backflow cycle runs about 20 seconds.

During one of the backflow cycles, a total of about 100 SCF of gas, preferably compressed air, is pulsed through the Venturi member at 5 to 50 pounds per square inch absolute, hereinafter psia, e.g., 30 psia. Each pulse is about 0.2 to about 2 seconds induction, usually between about 0.5 to 1 second, and is applied every 5 to 15 or so filtration-backflow complete cycles. Pulsing is not preferably used during each backflow cycle. The ratio by volumes of axial gas to backflow gas is between 1:2 and 3:1, preferably between 2:3 and 2:1.

By using this method, the clean-off time can be reduced by about 33%, and about 31% less backflow gas is needed.

Reasonable variations and modifications, which will be apparent to those skilled in the art, can be made in this invention without departing from the spirit and scope thereof.

What is claimed is:

1. A method for filtering dust from a stream of dust-laden gas, which comprises:
    (a) flowing a first stream of dust-laden gas into an interior volume of a first tubular fabric filter positioned in a first chamber and a second tubular fabric filter positioned in a second chamber, each of said first and second tubular fabric filters having a filter wall with an interior upstream surface and an exterior downstream surface, supported at longitudinally spaced apart positions against inward collapse by supportive rings adjacent the filter wall and tensioned along its longitudinal axis to a tension of between about 1 and 10 pounds per inch of circumference at the open end of the filter;
    (b) collecting adjacent the interior upstream surface of each filter wall at least a portion of the dust from the dust-laden first stream of gas and allowing at least a portion of the gas to pass through each filter wall;
    (c) intervallically repressuring at least a portion of the gas which passes through the filter wall of the first filter and flowing said gas from the exterior downstream surface of the second tubular fabric filter to the interior upstream surface of the second tubular fabric filter, the repressurized gas being at insufficient pressure to collapse the second tubular fabric filter;
    (d) intervallically repressurizing at least a portion of the gas which passes through the filter wall of the second filter and flowing said gas from the exterior downstream surface of the first tubular fabric filter to the interior upstream surface of the first tubular fabric filter, the repressurized gas being at insufficient pressure to collapse the first tubular fabric filter;
    (e) continuing steps (a), (b), and (c) for a number of times and then, while performing step (c),
    (f) introducing a pulse of gas axially and downwardly into the second tubular fabric filter;

(g) continuing steps (a), (b), and (d) for a number of times and then, while performing step (d), (h) introducing a pulse of gas axially and downwardly into the first tubular fabric filter.

2. A method as in claim 1 wherein each filter is tensioned to between about 1 and 4 pounds per inch of circumference at its open end.

3. A method as in claim 1 wherein the number of times that steps (a), (b) and (c) or (a), (b) and (d) are continued is between 5 and 15.

4. A method as in claim 2 wherein each pulse of gas axially introduced into the tubular fabric filter has a duration of from 0.2 seconds to 2 seconds and is introduced at a pressure of from 5 pounds per square inch to 50 pounds per square inch.

5. A method as in claim 4 wherein the ratio of the amount of axially introduced gas to the total amount of gas introduced in the repressurized stream is from about 1:2 to about 3:1.

6. A method as in claim 4 wherein said volumes are adjusted to that the ratio is from about 2:3 to about 2:1.

* * * * *